United States Patent [19]

Knollman et al.

[11] Patent Number: 5,072,327

[45] Date of Patent: Dec. 10, 1991

[54] ELECTRONIC PROTECTION DEVICE FOR USE WITH A FUSE MOUNT

[75] Inventors: Dieter J. H. Knollman, Arvada; Ulo Tamm, Broomfield, both of Colo.

[73] Assignees: AT&T Bell Laboratories, Murray Hill, N.J.; Illinois Tool Works, Inc., Glenview, Ill.

[21] Appl. No.: 469,646

[22] Filed: Jan. 24, 1990

[51] Int. Cl.$^5$ .............................................. H02H 5/04
[52] U.S. Cl. .................................. 361/106; 361/103; 361/59; 340/664
[58] Field of Search ................. 361/106, 105, 103, 58, 361/59, 74, 27; 219/505, 506; 340/638, 664, 595; 318/793, 471

[56] References Cited

U.S. PATENT DOCUMENTS

| | | | |
|---|---|---|---|
| H248 | 4/1987 | Middlebrooks | 340/639 |
| 3,158,713 | 11/1964 | Margulies | 200/87 |
| 3,781,839 | 1/1972 | Bodge | 340/239 |
| 3,936,700 | 2/1976 | Reiter | 317/22 |
| 4,015,171 | 3/1977 | Miller | 361/18 |
| 4,101,862 | 7/1978 | Takagi et al. | 338/23 |
| 4,189,698 | 2/1980 | Hara | 337/407 |
| 4,281,307 | 7/1981 | Hara | 337/114 |
| 4,514,723 | 4/1985 | Leal | 340/638 |
| 4,562,454 | 12/1985 | Schultz et al. | 357/51 |
| 4,661,807 | 4/1987 | Panaro | 340/638 |
| 4,691,197 | 9/1987 | Damiano et al. | 340/638 |
| 4,712,081 | 12/1987 | Bosley | 337/266 |

OTHER PUBLICATIONS

No. 70 Type Fuses, Spec sheet, Western Electric Co., Inc., (2-28-78).
PolySwitch ® PTC Device, Spec sheet, Raychem Corporation (07-07-89).

Primary Examiner—A. D. Pellinen
Assistant Examiner—C. S. Schultz
Attorney, Agent, or Firm—David Volejnicek

[57] ABSTRACT

An electronic protection device without moving parts uses an automatically-resetting overcurrent protection element, such as positive temperature coefficient device, and keeps its alarm contact terminal constantly in contact with the alarm contact point of a fuse mount. A coil spring is used not to move the alarm terminal but merely to constantly hold the alarm terminal in contact with the alarm point of the fuse mount. A transistor in the electric protection device has its base bias determined by the state of the overcurrent protection element, and has one of its other leads connected to the alarm terminal to generate thereat signals representative of the state of the overcurrent protection element without moving the alarm terminal.

15 Claims, 2 Drawing Sheets

ELECTRONIC PROTECTION DEVICE FOR USE WITH A FUSE MOUNT

TECHNICAL FIELD

The invention is directed to indicator or alarm fuses.

BACKGROUND OF THE INVENTION

Indicator fuses, also referred to as alarm fuses, are well known in the art. They are a circuit-protecting type of fuses that, upon tripping or "blowing", give an indication of being in the tripped state. The indication is typically visual (e.g., a change in color or position of an indicator "dot" or the lighting of a lamp or LED) or electrical (e.g., closure of an alarm electrical contact, typically by means of movement of a spring-operated contact-making plunger).

An illustrative example of an indicator fuse is the 70-type fuse of AT&T. The 70-type fuse is widely used to provide external-short protection to telecommunication line circuits. The fuse uses a conventional fusible element that melts and opens the circuit under application of too much current thereto. The fusible element is attached at one end to a capped coil spring and the cap bears a colored bead. When the fuse operates and the fusible element melts, it releases the spring which forces the cap on the spring against an alarm terminal of the fuse block to raise an alarm indication, and also causes the colored bead to protrude from the block to identify the fuse that blew.

Because of the self-destructive nature of the fusible element, the fuse must be replaced when the short that caused the fuse to blow is removed. The replacement of the fuse requires a maintenance visit from a craftsperson. Because of the large numbers of line circuits, and hence the large numbers of 70-type fuses present in typical telecommunication equipment such as concentrators, multiplexers, and switches, maintenance visits for the purpose of fuse replacement constitute a significant portion of all maintenance visits and therefore contribute greatly to the cost of maintaining and servicing the equipment. It is desirable to decrease this cost.

Reusable fuses, that use either manually or automatically-resettable fusing elements, are also known in the art. But resetting of a manually-resettable fusing element requires manipulation by a craftsperson, and therefore does not reduce the need for maintenance visits. While the use of automatically-resettable fusing elements does avoid this problem, it creates a new one: automatically-resettable fusing elements typically do not produce the kinetic energy (e.g., plunger movement) that is often necessary to set and/or reset the indication of the fuse's state. Consequently, a barrier exists to the use of automatically-resettable fusing elements in indicator fuses, at least those of the electrical, alarm contact-closure, type.

SUMMARY OF THE INVENTION

This invention is directed to solving this and other disadvantages of the prior art. According to the invention, an electronic protection device having the function of a fuse has a pair of electrical terminals interconnected by a triggerable and automatically-resetting overcurrent protection element, and a third electrical terminal (e.g., the alarm terminal) statically mounted in relation to the pair of terminals, such as on a fuse body that supports all three terminals. In use, this third terminal constantly contacts the alarm contact point of a fuse mount in which the electronic protection device is mounted. A device in the electronic protection device, such as a transistor or some other switching element, is connected to the third terminal, and responds to the overcurrent protection element being triggered by generating a first signal (e.g., a closed-contact alarm) at the third terminal, and further responds to the overcurrent protection element being reset by generating a second signal (e.g., an open contact) at the third terminal, all without movement of the third terminal.

Advantageously, the invention enables implementation of even an electrical alarm contact-closure type indicator device without the use of moving parts, and hence enables the use of an automatically-resetting overcurrent protection element in such an indicating device. Because the electronic protection device is reusable and both its overcurrent protection element and alarm indication are automatically resetting, the electronic protection device does not generally require a maintenance visit after triggering. Hence, maintenance visits to, and maintenance costs of, a system that uses such devices are reduced.

This and other features and advantages of the invention will become apparent from the following discussion of an illustrative embodiment of the invention taken together with the drawing.

DETAILED DESCRIPTION

Figure 1:
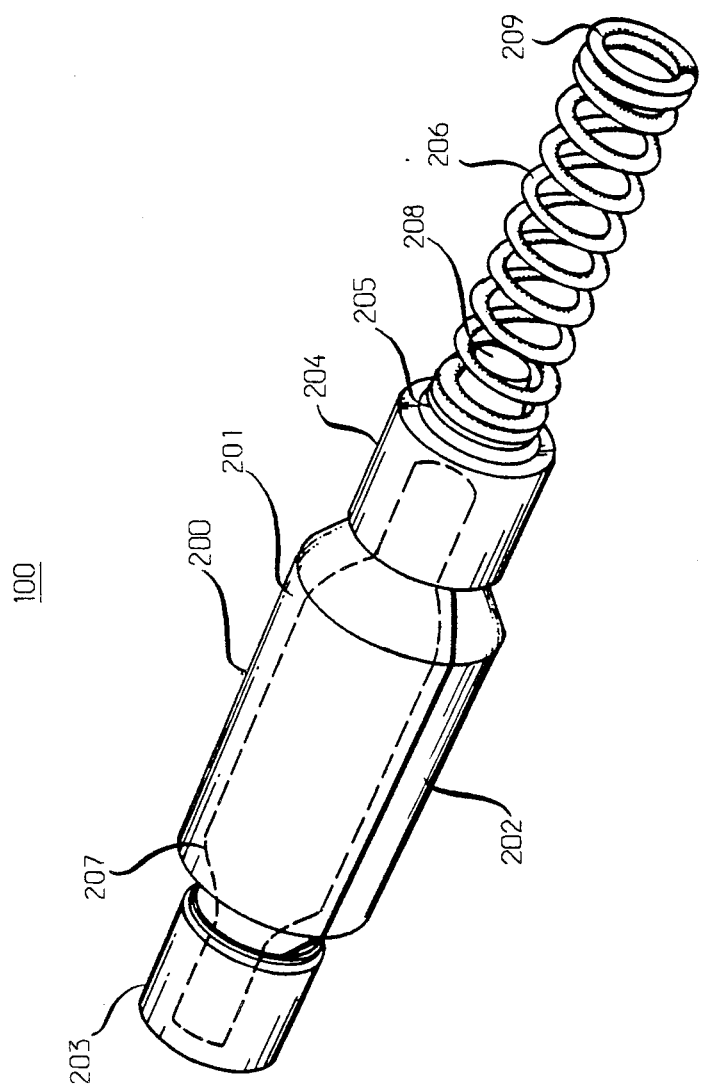
FIG. 1 shows an electronic protection device that includes an illustrative embodiment of the invention.

FIG. 1 shows the physical configuration of an electronic protection device 100 embodying an illustrative example of the invention. Electronic protection device 100 includes a hollow body portion 200 that forms a shell or capsule enclosing a circuit pack 207, shown in dotted lines. Body portion 200 is made up of two half-shells or half-body portions 201, 202. Portions 201 and 202 together form an enclosure for circuit pack 207. Portions 201 and 202 are held together by crimping action of an end cap 203 and an end band 204, which fit over the ends of half-body portions 201 and 202. End cap 203 and end band 204 are conductive and provide a pair of electrical contacts to circuit pack 207. Extending through end band 204 out of body portion 200 is a conductive coil spring 206 which is connected at one end to circuit pack 207 to provide a third electrical contact thereto. Spring 206 is electrically isolated from end band 204 by a nonconductive collar 205. Also protruding from body portion 200 through end band 204 and surrounded by spring 206 is a light-emitting diode (LED) 208, which takes the place of the colored bead of a 70-type fuse.

The various physical elements of electronic protection device 100 are dimensioned to enable electronic protection device 100 to take the place of a 70-type fuse in existing installations.

Figure 2:
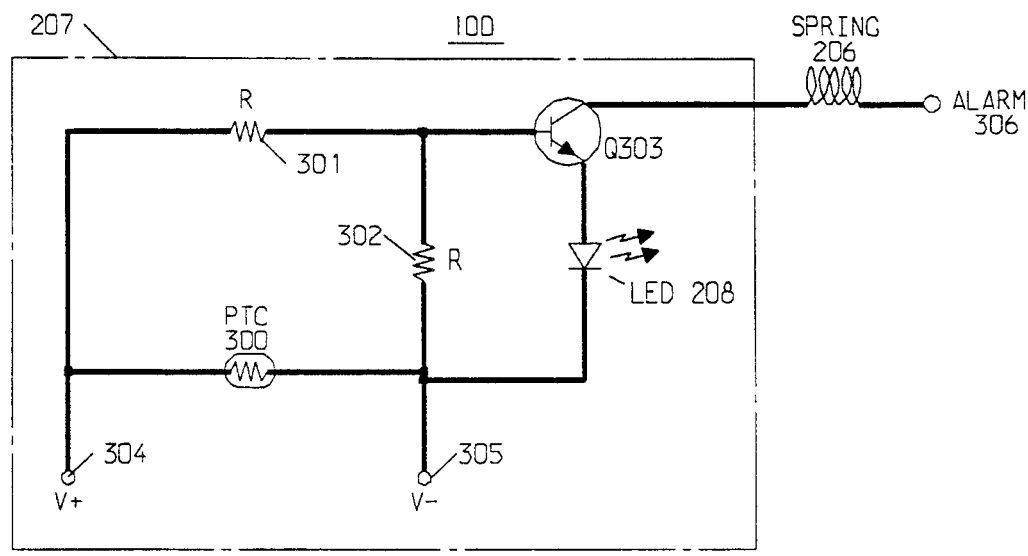
FIG. 2 is a circuit diagram of the electronic protection device of FIG. 1.

FIG. 2 shows the circuit diagram of electronic protection device 100—specifically of circuit pack 207. Replacing the fusible element of a 70-type fuse is a positive temperature coefficient element (PTC) 300. Element 300 is illustratively the Raychem Corporation PDS 21647 Poly Switch ® PTC device. PTC 300 trips to create an open-circuit condition when a current above a predetermined threshold is applied thereto, and automatically resets to re-create a closed-circuit condition when current exceeding the threshold is removed. PTC 300 is connected in series between two terminals 304 and 305, designated as V+ and V− and formed by end cap 203 and end collar 204. Also connected to terminal 304 is one lead of a resistor(R) 301, the other lead of which is connected to the control terminal of a switch—the base of a transistor(Q) 303 in this example. A resistor(R) 302 is connected between the base of transistor 303 and terminal 305. The emitter lead of transistor 303 is connected to one lead of LED 208, whose other lead is connected to terminal 305. The collector lead of transistor 303 is connected to the one end of spring 206 which reposes inside body portion 200, while the other end 209 (see FIG. 1) of spring 206 which reposes outside of body portion 200 forms a third terminal 306, designated as ALARM.

Spring 206 statically mounts terminal 306 on body portion 200. "Statically mounted" as used in this application means that, while terminal 306 may be movable with respect to body portion 200 (for example, in order to facilitate insertion of the electronic protection device into a fuse mount), its purpose is not to move nor does its operation depend on its moving. This enables electronic protection device 100 to be constructed with no moving parts.

Figure 3:
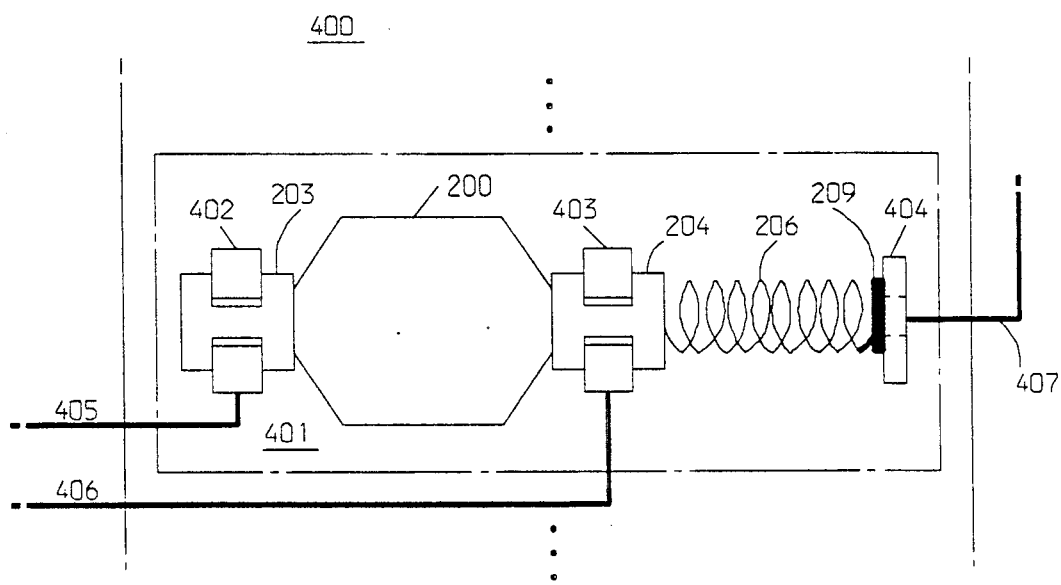
FIG. 3 shows an illustrative arrangement using the electronic protection device of FIG. 1.

An illustrative configuration involving the use of electronic protection device 100 is shown in FIG. 3. Electronic protection device 100 is there shown mounted in a conventional 70-type fuse mount position 401 of a conventional fuse block 400. End cap 203 and end collar 204 are gripped by (i.e., are electrically connected to) a pair of conventional fuse clips 402 and 403, respectively, that define fuse mount position 401 in a fuse block 400. End 209 of spring 206 contacts (i.e., is electrically connected to) an alarm contact terminal 404 of that fuse mount position 401 of fuse block 400. The purpose of spring 206 is not to move end 209 into and out of contact with terminal 404, but rather initially to facilitate insertion of electronic protection device 100 into fuse position 401 and thereafter to constantly and snugly hold end 209 in contact with terminal 404. Each clip 402 and 403 and contact terminal 404 is connected to a respective conductor (e.g., wire) 405-407, in the conventional manner.

During normal operation, PTC 300 creates a short circuit between terminals 304 and 305, leaving the base lead of transistor 303 unpowered and hence rendering transistor 303 nonconducting. Hence, LED 208 is turned off, and also a first signal (or no signal, depending upon how one wishes to view this condition) is generated at alarm terminal 306. When current exceeding the rated threshold of PTC 300 flows between terminals 304 and 305, PTC 300 trips and opens the path between terminals 304 and 305 to interrupt that flow of current. Connection between terminals 304 and 305 now exists through resistors 301 and 302. This has the effect of biasing the base of transistor 303 and thus turning on transistor 303. The turning on of transistor 303 creates a conducting path between alarm terminal 306 and terminal 305, through spring 206 and LED 208. This creates a second signal at alarm terminal 306, and also turns on LED 208. The second signal at alarm terminal 306 is used to raise a remote alarm indication, while LED 208 locally indicates which electronic protection device has blown.

After some period of time, PTC 300 automatically resets and reestablishes a closed-circuit condition between terminals 304 and 305. If the fault condition that created a current between terminals 304 and 305 that exceeded the rated threshold of PTC 300 has not been removed, PTC 300 automatically triggers again. If and when the fault condition has been removed, resetting of PTC 300 does not cause PTC 300 to immediately trigger again, but PTC 300 remains reset and reestablishes the normal operating conditions.

Of course, it should be understood that various changes and modifications may be made to the above-described illustrative embodiment of the invention. For example, the polarities of terminals 304 and 305, LED 208, and transistor 303 may be reversed. Or, LED 208 may be replaced by a different indicator, such as a lamp or a buzze or some other suitable generator of a sensory signal, or it may even be eliminated. Also, PTC 300 may be replaced by some other suitable fusing element. Similarly, transistor 303 may be replaced by a different switch. Furthermore, any part or even the whole of the electronic protection device circuit may be replaced by a different arrangement, such as a flexible bimetallic element that normally connects terminals 304 and 305 but when heated flexes from that position to disconnect from terminal 304 and instead connect to spring 206. Additionally, spring 206 may be replaced by some other element, e.g., a piston or a rod or a wire with a clip, to make constant contact with alarm terminal 306. Such changes and modifications may be made without departing from the spirit and the scope of the invention. It is therefore intended that such changes and modifications be covered by the following claims.

We claim:

1. An electronic protection device, comprising:
   an elongated body portion defining a pair of end projections at opposite ends of the body portion;
   a first and a second electrical terminal for making external electrical contacts with the electronic protection device, the first and the second electrical terminals each being substantially a hollow body mounted on the body portion around a different one of the end projections;
   a triggerable and automatically-resetting overcurrent protection element mounted in the body portion and connecting the first terminal with the second terminal;
   a third electrical terminal for making external electrical contact with the electronic protection device, the third electrical terminal comprising a resilient compressible conductive member mounted at one end to the body portion and extending from one of the end projections away from the body portion in line with the pair of end projections to define at another end of the member an electrical contact that is positioned adjustably fixedly in relation to the first and second terminals; and
   electrical signal generating means mounted in the body portion and connected to the third terminal, responsive to the overcurrent protection element for generating a first electrical signal at the third terminal in response to the overcurrent protection element being triggered and for generating a second electrical signal at the third terminal in response to the overcurrent protection element being reset, without moving the third terminal.

2. The electronic protection device of claim 1 further comprising:

means mounted in the body portion and responsive to the overcurrent protection element for generating a sensory signal in response to the overcurrent protection element being one of triggered and reset, and for abstaining from generating the sensory signal in response to the overcurrent protection element being the other of triggered and reset.

3. The electronic protection device of claim 1 wherein: the overcurrent protection element comprises a positive temperature coefficient device.

4. The electronic protection device of claim 1 wherein:

the compressible conductive member is a coil spring.

5. The electronic protection device of claim 1 wherein:

the electrical signal generating means comprise means responsive to the overcurrent protection element being one of triggered and reset for one of connecting and disconnecting the third terminal to/from one of the first and second terminals.

6. The electronic protection device of claim 1 wherein:

the electrical signal generating means comprise switching means responsive to the overcurrent protection element being one of triggered and reset for one of making and breaking an electrical connection to the third terminal.

7. The electronic protection device of claim 6 wherein:

the switching means comprise a transistor having a base lead biased by the overcurrent protection element and having another lead connected to the third terminal.

8. The electronic protection device of claim 1 wherein:

the electrical signal generating means comprise a transistor having a base lead, a first lead connected to the third terminal, and a second lead connected to the first terminal;

a first resistor connecting the base lead to the first terminal; and a second resistor connecting the base lead to the second terminal.

9. The electronic protection device of claim 1 having all parts fixedly positioned with respect to each other during operation of the electronic protection device.

10. The electronic protection device of claim 1 further comprising:

sensory indicator means encircled by one of the first and second electrical terminals and mounted in the body portion at the end projection from which the member of the third electrical terminal extends, the sensory indicator means responsive to the overcurrent protection element for generating a sensory signal that is externally sensorily detectable at the end projection at which the sensory indicator means is mounted, in response to the overcurrent protection element being one of triggered and reset, and for abstaining from generating the sensory signal in response to the overcurrent protection element being the other of triggered and reset.

11. The electronic protection device of claim 10 wherein:

the sensory indicator means include an LED connecting the second lead to the first terminal.

12. The electronic protection device of claim 10 wherein the sensory indicator means is fixedly positioned with respect to the other elements of the electronic protection device during operation of the device.

13. The electronic protection device of claim 10 wherein the sensory indicator means comprises a visual indicator that is externally visible at the end projection from which the member of the third electrical terminal extends.

14. An electronic protection device for use with a fuse mount having three substantially co-linear and fixedly positioned fuse contact points, comprising:

an elongated body portion defining a pair of end projections at opposite ends of the body portion;

a first and a second electrical terminal for constantly contacting a first and a second one of the fuse contact points when the electronic protection device is mounted in the fuse mount, the first and the second electrical terminals each being substantially a hollow body mounted on the body portion around a different one of the end projections;

a triggerable and automatically-resetting overcurrent protection element mounted in the body portion and connecting the first terminal with the second terminal;

a third electrical terminal for constantly contacting a third one of the fuse contact points when the electronic protection device is mounted in the fuse mount, the third electrical terminal comprising a resilient compressible conductive member mounted at one end to the body portion and extending from one of the end projections away from the body portion in line with the pair of end projections to the third fuse contact point and pressing against the third fuse contact point to make constant electrical contact therewith; and electrical signal generating means mounted in the body portion and connected to the third terminal and responsive to the overcurrent protection element for generating a first electrical signal at the third terminal in response to the overcurrent protection element being triggered and for generating a second electrical signal at the third terminal in response to the overcurrent protection element being reset, without moving the third terminal.

15. The electronic protection device of claim 13 further comprising:

sensory indicator means encircled by one of the first and second electrical terminals and mounted in the body portion at the end projection from which the member of the third electrical terminal extends, the sensory indicator means responsive to the overcurrent protection element for generating a sensory signal that is externally sensorily detectable at the end projection at which the sensory indicator means is mounted, in response to the overcurrent protection element being one of triggered and reset, and for abstaining from generating the sensory signal in response to the overcurrent protection element being the other of triggered and reset.

* * * * *

UNITED STATES PATENT AND TRADEMARK OFFICE
CERTIFICATE OF CORRECTION

PATENT NO. : 5,072,327

DATED : December 10, 1991

INVENTOR(S) : Bjarne Frederiksen, Dieter J. H. Knollman, Ulo Tamm

It is certified that error appears in the above-identified patent and that said Letters Patent is hereby corrected as shown below:

On the title page, in item [19] "Knollman" should be --Frederiksen--; and in item [75] Inventors: please insert --Bjarne Frederiksen, Villa Park, Ill. --, before the first named inventor.

Signed and Sealed this

Thirteenth Day of April, 1993

*Attest:*

STEPHEN G. KUNIN

*Attesting Officer*     *Acting Commissioner of Patents and Trademarks*